(12) United States Patent
Kumar et al.

(10) Patent No.: US 10,991,365 B2
(45) Date of Patent: Apr. 27, 2021

(54) AUTOMATED SPEECH RECOGNITION CONFIDENCE CLASSIFIER

(71) Applicant: Microsoft Technology Licensing, LLC, Redmond, WA (US)

(72) Inventors: Kshitiz Kumar, Redmond, CA (US); Anastasios Anastasakos, San Jose, CA (US); Yifan Gong, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 193 days.

(21) Appl. No.: 16/377,967

(22) Filed: Apr. 8, 2019

(65) Prior Publication Data

US 2020/0320985 A1 Oct. 8, 2020

(51) Int. Cl.
*G10L 15/22* (2006.01)
*G10L 15/32* (2013.01)
*G10L 15/183* (2013.01)
*G06K 9/62* (2006.01)
*G10L 15/02* (2006.01)
*G10L 15/06* (2013.01)
*G10L 15/16* (2006.01)
*G10L 15/01* (2013.01)

(52) U.S. Cl.
CPC .......... *G10L 15/183* (2013.01); *G06K 9/6267* (2013.01); *G10L 15/02* (2013.01); *G10L 15/063* (2013.01); *G10L 15/01* (2013.01); *G10L 15/16* (2013.01); *G10L 15/22* (2013.01); *G10L 15/32* (2013.01)

(58) Field of Classification Search
CPC ......... G10L 15/01; G10L 15/16; G10L 15/22; G10L 15/32
See application file for complete search history.

(56) References Cited

U.S. PATENT DOCUMENTS

| | | | | |
|---|---|---|---|---|
| 9,373,329 B2* | 6/2016 | Strope | ..................... | G10L 15/32 |
| 9,607,616 B2* | 3/2017 | Watanabe | ............ | G10L 15/1822 |
| 2006/0271364 A1* | 11/2006 | Mirkovic | ................ | G06F 40/40 |
| | | | | 704/239 |

FOREIGN PATENT DOCUMENTS

DE 602006000090 T2 * 9/2008 ............. G10L 15/22

OTHER PUBLICATIONS

Ghannay, et al., "Combining continuous word representation and prosodic features for ASR error prediction," International Conference on Statistical Language and Speech Processing, Nov. 17, 2015, pp. 84-95. (Year: 2015).*

(Continued)

*Primary Examiner* — Feng-Tzer Tzeng
(74) *Attorney, Agent, or Firm* — Schwegman Lundberg & Woessner, P.A.

(57) ABSTRACT

A method of enhancing an automated speech recognition confidence classifier includes receiving a set of baseline confidence features from one or more decoded words, deriving word embedding confidence features from the baseline confidence features, joining the baseline confidence features with word embedding confidence features to create a feature vector, and executing the confidence classifier to generate a confidence score, wherein the confidence classifier is trained with a set of training examples having labeled features corresponding to the feature vector.

20 Claims, 4 Drawing Sheets (56) References Cited

OTHER PUBLICATIONS

Ghannay, et al., "Word Embeddings Combination and Neural Networks for Robustness in ASR Error Detection," 2015 23rd European Signal Processing Conference (EUSIPCO). (Year: 2015).*

Kumar, et al., "Word characters and phone pronunciation embedding for ASR confidence classifier," ICASSP 2019. (Year: 2019).*

Bishop, Christopher M., "Pattern Recognition and Machine Learning", by Springer, Jan. 2006, pp. 137-152.

Dahl, George E., et al., "Context-Dependent Pre-Trained Deep Neural Networks for Large-Vocabulary Speech Recognition", In Proceedings of IEEE Transactions on Audio, Speech, and Language Processing, vol. 20, Issue 1, Jan. 2012, pp. 30-42.

Deng, Li, et al., "Recent Advances in Deep Learning for Speech Research at Microsoft", In Proceedings of IEEE International Conference on Acoustics, Speech and Signal Processing, May 26, 2013, 5 Pages.

Fiscus, Jonathan G., "A Post-Processing System to Yield Reduced Word Error Rates: Recognizer Output Voting Error Reduction (ROVER)", In IEEE Workshop on Automatic Speech Recognition and Understanding, Dec. 14, 1997, pp. 347-354.

Hinton, Geoffrey, et al., "Deep neural networks for acoustic modeling in speech recognition: The shared views of four research groups", In IEEE Signal Processing Magazine, vol. 29, Issue 6,, Nov. 2012, pp. 82-97.

Gillick, Larry, et al., "A Probabilistic Approach to Confidence Estimation and Evaluation", In Proceedings of IEEE International Conference on Acoustics, Speech, and Signal Processing, Apr. 21, 1997, 4 Pages.

Siu, Manhung, et al., "Evaluation of Word Confidence for Speech Recognition Systems", In Journal of Computer Speech and Language, vol. 13, Issue 04, Oct. 1, 1999, pp. 299-319.

Hinton, Geoffrey, et al., "Deep Neural Networks for Acoustic Modeling in Speech Recognition", In Proceedings of the IEEE Signal Processing Magazine, vol. 29, Issue 6, Apr. 27, 2012, 27 Pages.

Huang, Po Son, et al., "Predicting Speech Recognition Confidence using Deep Learning with Word Identity and Score Features", In Proceedings of IEEE International Conference on Acoustics, Speech and Signal Processing, May 26, 2013, 5 Pages.

Huang, Yan, et al., "Semi-Supervised GMM and DNN Acoustic Model Training with Multisystem Combination and Confidence Re-Calibration", In Interspeech, Aug. 25, 2013, pp. 2360-2364.

Jiang, Hui, "Confidence Measures for Speech Recognition: A Survey", In Journal of Speech Communication, vol. 45, Issue 4, Apr. 1, 2005, 28 Pages.

Kemp, Thomas, et al., "Estimating Confidence Using Word Lattices", In Proceedings of 5th European Conference on Speech Communication and Technology, Sep. 22, 1997, 4 Pages.

Kumar, Kshitiz, et al., "Confidence-Features and Confidence-Scores for ASR Applications in Arbitration and DNN Speaker Adaptation", In Proceedings of Sixteenth Annual Conference of the International Speech Communication Association, Sep. 6, 2015, pp. 702-706.

Kumar, Kshitiz, et al., "Normalization of ASR Confidence Classifier Scores via Confidence Mapping", In Proceedings of Fifteenth Annual Conference of the International Speech Communication Association, Sep. 14, 2014, pp. 1199-1203.

Moreno, Pedro J., et al., "A Boosting Approach for Confidence Scoring", In Proceedings of 7th European Conference on Speech Communication and Technology, Sep. 3, 2001, 4 Pages.

Neti, Chalapathy V., et al., "Word-Based Confidence Measures as a Guide for Stack Search in Speech Recognition", In Proceedings of IEEE International Conference on Acoustics, Speech, and Signal Processing, vol. 2, Apr. 21, 1997, pp. 883-886.

Pennington, Jeffrey, et al., "GloVe: Global Vectors for Word Representation", In Proceedings of the 2014 Conference on Empirical Methods in Natural Language Processing, Oct. 2014, pp. 1532-1543.

Rueber, Bernhard, "Obtaining Confidence Measures from Sentence Probabilities", In Proceedings of 5th European Conference on Speech Communication and Technology, Sep. 22, 1997, 4 Pages.

Sak, Hasim, et al., "Long Short-term Memory Recurrent Neural Network Architectures for Large Scale Acoustic Modeling", In Proceedings of Fifteenth Annual Conference of the International Speech Communication Association, Sep. 14, 2014, 5 Pages.

Wessel, Frank, et al., "Confidence Measures for Large Vocabulary Continuous Speech Recognition", In Proceedings of IEEE Transactions on Speech and Audio Processing vol. 9 , Issue 3, Mar. 2001, pp. 288-298.

Sukkar, Rafid, A., "Rejection for Connected Digit Recognition Based on GPD Segmental Discrimination", In Proceedings of IEEE International Conference on Acoustics, Speech and Signal Processing, vol. 1, Apr. 19, 1994, pp. I-393.

Wessel, Frank, et al., "A Comparison of Word Graph and n-Best list Based Confidence Measures", In Proceedings of Sixth European Conference on Speech Communication and Technology, Sep. 5, 1999, 4 Pages.

Wessel, Frank, et al., "Using Word Probabilities as Confidence Measures", In Proceedings of the IEEE International Conference on Acoustics, Speech and Signal Processing, May 12, 1998, 4 Pages.

White, Christopher, et al., "Maximum Entropy Confidence Estimation for Speech Recognition", In Proceedings of IEEE International Conference on Acoustics, Speech and Signal Processing, Apr. 15, 2007, 4 Pages.

Yu, Deng, et al., "Calibration of Confidence Measures in Speech Recognition", In Proceedings of IEEE Transactions on Audio, Speech, and Language Processing, vol. 19, Issue 8, Nov. 2011, 13 Pages.

Chase, Lin, "Word and Acoustic Confidence Annotation for Large Vocabulary Speech Recognition", In Proceedings of the 5th European Conference on Speech Communication and Technology, Sep. 22, 1997, pp. 815-818.

Ghannay et al., "Word Embeddings Combination and Neural Networks for Robustness in ASR Error Detection", In Proceedings of the 23rd European Signal Processing Conference (EUSIPCO), Aug. 31, 2015, pp. 1671-1675.

Jiang et al., "An Experimental Study on Confidence Measures for Robust Speech Recognition", In Proceedings of the International Conference on Advances in Pattern Recognition, Jan. 1, 1999, pp. 265-274.

Kumar et al., "Word Characters and Phone Pronunciation Embedding for ASR Confidence Classifier", In Proceedings of IEEE International Conference on Acoustics, Speech and Signal Processing, May 12, 2019, pp. 2712-2716.

International Search Report and Written Opinion Issued in PCT Application No. PCT/US2020/021287, dated May 25, 2020, 14 Pages.

Errattahi et al., "Incorporating Label Dependency for ASR Error Detection via RNN", In Procedia Computer Science, vol. 148, Feb. 23, 2019, pp. 266-272.

Ghannay et al., "Combining Continuous Word Representation and Prosodic Features for ASR Error Prediction", In International Conference on Statistical Language and Speech Processing, Nov. 17, 2015, pp. 84-95.

Simonnet et al., "ASR Error Management for Improving Spoken Language Understanding", In repository of arXiv, arXiv:1705.09515, May 26, 2017, 5 Pages.

* cited by examiner

| EMBEDDING TYPES | EMBEDDING REPRESENTATION FOR "CORTANA" |
|---|---|
| CHARACTER EMBEDDING | C O R T A N A |
| PRONUNCIATION EMBEDDING | K AO R T AE N AX<br>K AO R T AA N RA |

AUTOMATED SPEECH RECOGNITION CONFIDENCE CLASSIFIER

BACKGROUND

A confidence classifier is an integral component of automatic speech recognition (ASR) systems. Classifiers predict the accuracy of an ASR hypothesis by associating a confidence score in [0,1] range, where a larger score implies higher probability of the hypothesis being correct. While such classifiers work well for native language speakers, speech with different accents can lead to higher false alarm rates. In other words, the confidence score in a predicted word can be too high, leading an application receiving the classifier output to believe the correct word has been provided.

SUMMARY

A method of enhancing an automated speech recognition confidence classifier includes receiving a set of baseline confidence features from one or more decoded words, deriving word embedding confidence features from the baseline confidence features, joining the baseline confidence features with word embedding confidence features to create a feature vector, and executing the confidence classifier to generate a confidence score, wherein the confidence classifier is trained with a set of training examples having labeled features corresponding to the feature vector.

In a further embodiment, a system configured to perform the method. In yet a further embodiment, a computer readable media has code stored thereon to cause a computer to perform the method when executing the code.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Automatic speech recognition (ASR) has added significantly to hands-free communication with devices such as smartphones, tablets, game consoles, etc. ASR technologies have been very successful in the past decade and have seen a rapid deployment from laboratory settings to real-life situations.

Although perfect recognition from ASR is desired, the actual decoded utterances are invariably erroneous. In this context, a confidence measure on the recognized utterance provides a quantitative representation on the reliability of an ASR decoding. This confidence measure is especially important for applications where an ASR-enabled device is always in an active listening mode in an application-constrained grammar. An application-constrained grammar in one example application can consist of game media commands like play/pause etc. There sometimes background OOG speech (that doesn't contain play command) can trigger one of the IG commands, and confidence measure can be used to evaluate its correctness. There it is likely that some out-of-grammar (OOG) utterances may still be recognized as an in-grammar (IG) utterance.

Confidence classifiers are trained to provide a measure on the reliability of the decoded utterance in order to help reject OOG utterances. Confidence measures are also used for validating ASR decoding in presence of background noise, reverberation and other mismatched acoustic conditions. Confidence measures can be trained for word-based as well as utterance-based confidences.

ASR confidences have numerous applications. Confidences are key metrics that help speech applications better handle their responses to possibly incorrect ASR hypothesis. Confidence classifiers are used for push-to-talk devices like cell phones but are also used for continuously listening devices like Xbox, where the speech engine is always running in background. Thus, the ASR is listening to speech intended for it as well as unintended speech in side-speech, background noise, and other ambient sounds. There the ASR can produce in-grammar (IG) recognitions for unintended or out-of-grammar (OOG) utterances. ASR systems leverage confidence classifiers to possibly detect incorrect recognitions and avoid a system response.

A multilayer perceptron (MLP) or a deep learning model may be used to train the confidence scores from a defined set of features. Many confidence features and training methods have been developed and used for predicting confidences. Confidence scores can be computed for words as well as utterances. To improve the confidence scores, word embedding confidence features may be derived and added to the set of features.

Figure 1:
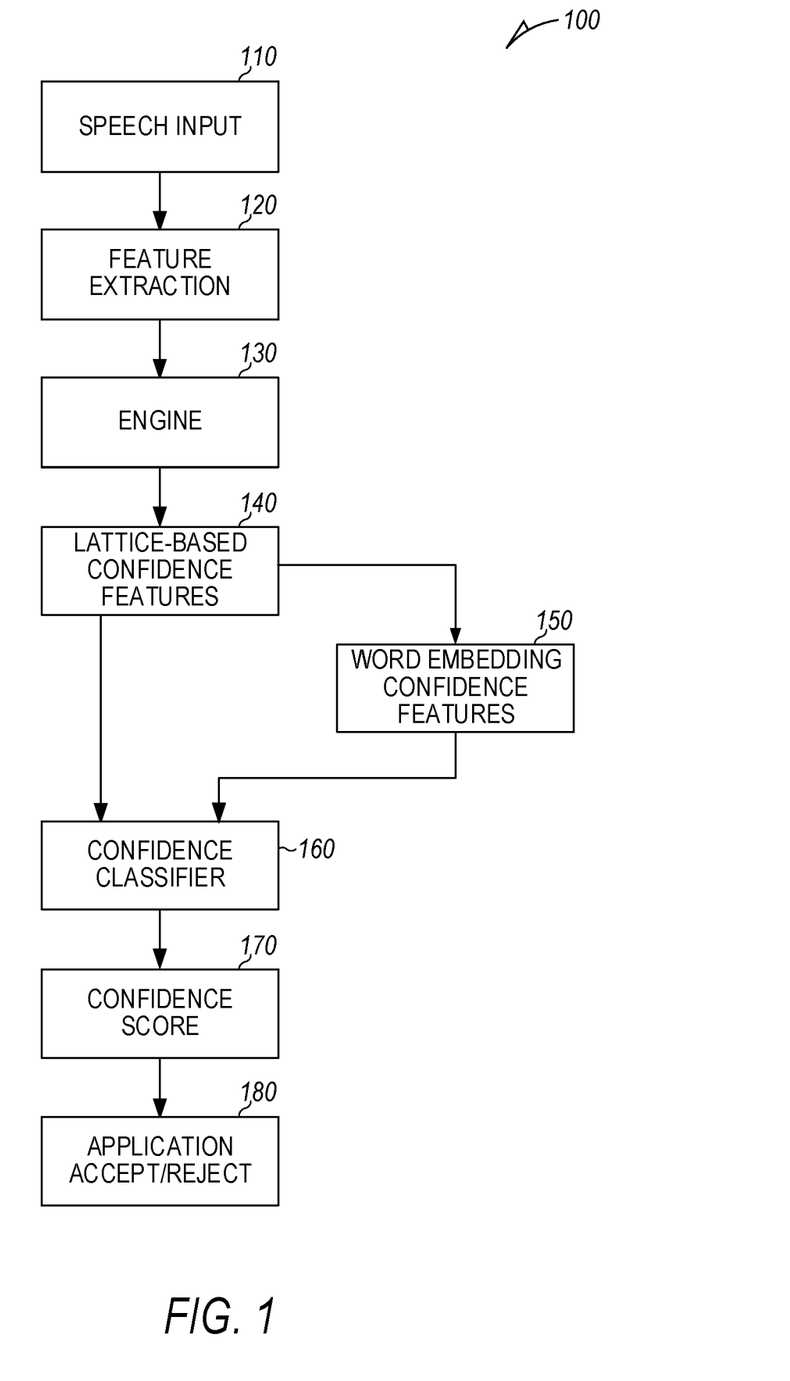
FIG. 1 is a block flow diagram illustrating an enhanced speech recognition system having added word embedding features according to an example embodiment.

FIG. 1 is a block flow diagram illustrating an enhanced speech recognition system 100. Speech utterances are received at speech input 110. The input sequence can be at a word level or an utterance level. Features are extracted at feature extraction 120 in a known manner. The extracted features are provided to an ASR engine 130 that decodes speech, and produces a hypothesis as well as a set of features, such as lattice-based confidence features 140. A lattice is a representation of alternative word-sequences that are sufficiently likely for a particular utterance. The engine 130 provides acoustic model (AM) and language model (LM)-based scores. The scores are normalized for the utterance length. The lattice-based confidence features 140 are a baseline feature set (denoted as Generic Features) consisting of 16 predictors in one embodiment.

The features 140 are used to derive word embedding confidence features 150. The features 140 and word embedding confidence features 150 are concatenated and provided to a confidence classifier 160 that has been trained on both sets of features. The confidence classifier 160 determines whether the input 110 sequence is in-grammar (IG) or out-of-grammar (OOG). A multi-layer perceptron (MLP) may be used for IG vs. OOG decision making. An MLP is trained for a word-level as well an utterance-level classification. The output of the MLP is the confidence score for the input utterance.

In some embodiments, the confidence classifier 160 produces a confidence score 170 that is provided to an application 180. The application 180 may accept or reject the hypothesis. In other words, the application 180 may chose to accept or ignore the word or sequence of words that were hypothesized by the engine 130 based on the confidence score.

Speech applications 180 consume these scores and make a decision on accepting recognition events by comparing the score against a set threshold, such as 0.8 ([0,1] range, where larger score implies higher probability of the hypothesis being correct) or other threshold that may be application dependent. The confidence scores help mitigate unwarranted application responses to background noise or TV sound etc. tasks.

The word embedding confidence features 150 are used to improve confidence classifiers. Word character and phone pronunciation embedding is used to specially represent and factorize acoustic confidence features.

Confidence classification may be expressed as a binary classification problem with the 2-classes in: (1) correct SR recognitions, (2) incorrect recognitions that includes misrecognitions over IG utterances as well recognitions from OOG utterances or background audio. Example confidence features may include:
1. acoustic-model scores
2. background-model scores
3. silence-model and noise-model scores
4. language-model scores
5. duration features The baseline confidence features 140 in one embodiment include 21 features that are obtained from ASR lattices during decoding. Confidence features may be obtained from background, silence, and noise model scores. A set of language model (LM) features may be obtained to represent LM score, perplexity and fanout. Duration-based features may be included to model speaking rate and absolute speech duration. The features may be normalized to be robust to speech with different duration and intensity.

New confidence features, such as word embedding confidence features 150, may be added to further improve the confidence performance. An acoustic score for individual words is obtained in an ASR hypothesis as an aggregation of frame-level acoustic scores for a corresponding particular word. A stronger acoustic score indicates greater match of the constituent speech frames with the acoustic model, thus greater probability of the word being correct. ASR systems use context-dependent tied-triphones, i.e. senones, as states to represent the words. During decoding, the best path is found along the states, under language model constraints, to predict the best hypothesis.

The per-frame acoustic score represents a match between the speech frame and the particular acoustic state. Note that the baseline confidence features 140 include duration that implicitly helps explain acoustic score from smaller vs. longer words. Additionally, a number of normalizations of engine scores is performed on the baseline confidence features. Still the acoustic scores based on the baseline confidence features have a significant dependency upon the underlying acoustic states. The dependency of the acoustic score upon the underlying acoustic states is accounted for with word embeddings by representing acoustic scores in terms of acoustic states.

Acoustic scores are typically significant features for ASR confidence classifiers. However, a dependency between the acoustic scores and underlying ASR states exists. A confidence classifier assigns higher confidence score to words with stronger acoustic scores but such dependency on acoustic scores implies that the aggregated acoustic scores are insufficient at precisely representing the acoustic match without representing the underlying acoustic states. Assuming a large-scale ASR task that consists of data across acoustic conditions, speakers, and audio pipeline, considerable variation in acoustic scores occurs for even correctly recognized words.

Figure 2:
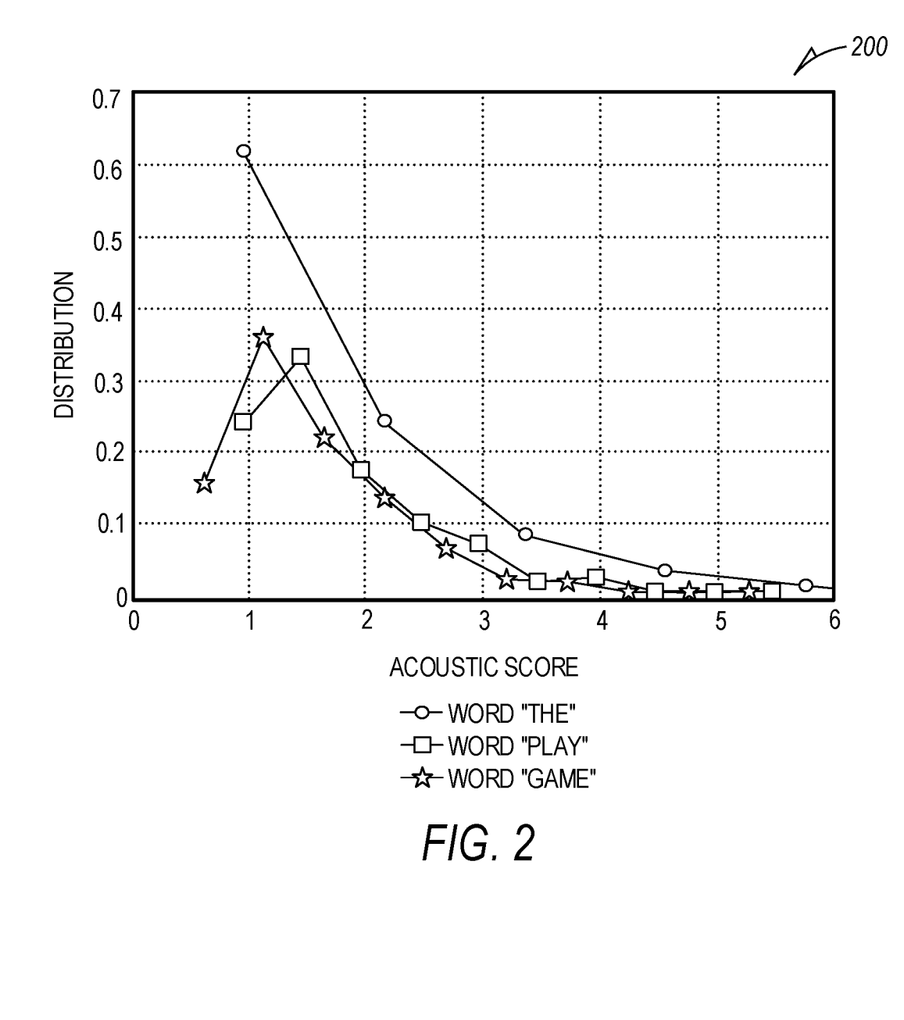
FIG. 2 is a graph illustrating dependency of words with associated acoustic scores according to an example embodiment.

In one embodiment, the dependency between a few words and associated acoustic scores is shown in FIG. 2 in graphic form at 200. A distribution of the acoustic score for 3 words is shown respectively at 210, 220, and 230 for: "The", "Play", and, "Game." A lower acoustic score indicates a stronger match. The distribution was obtained from words that were correctly recognized by an ASR system. Assuming the rest of the confidence features to be identical, differences in acoustic scores will impact confidence scores. Confidence scores indicate the probability of the word being correct, so different acoustic score distributions as illustrated at 210, 220, and 230 will lead to different interpretation for "The" and "Play" words for any given confidence score. For example, the recognized word "The" at confidence of 0.9, may have higher or lower probability of being correct than the word "Play" at confidence 0.9.

Word embedding features are used to represent and rationalize acoustic score in acoustic states. Two different types of word embedding features, word character embedding and phone pronunciation embedding may be used. The different types of word embedding features may be used alone or in combination, and are added to the baseline confidence features 140 described above.

Word character embedding may be used to represent and factorize acoustic scores. The word character embedding in one embodiment is simply a count of the letters in the language. For enUS (English United States), a 26-dimensional character embedding is built, corresponding to each letter. Other languages may have a different number of letters and corresponding different number of dimensional character embedding. enUS is based on the Roman alphabet. Other common alphabets with differing number of letters include Arabic, Cyrillic, and Latin. In further embodiments, less than all the letters may be used for word character embedding. Some applications may select a subset of the letters in a corresponding language for word character embedding to minimally increase the complexity or size of the model. For example, five embeddings from vowels may be used.

Figure 3:
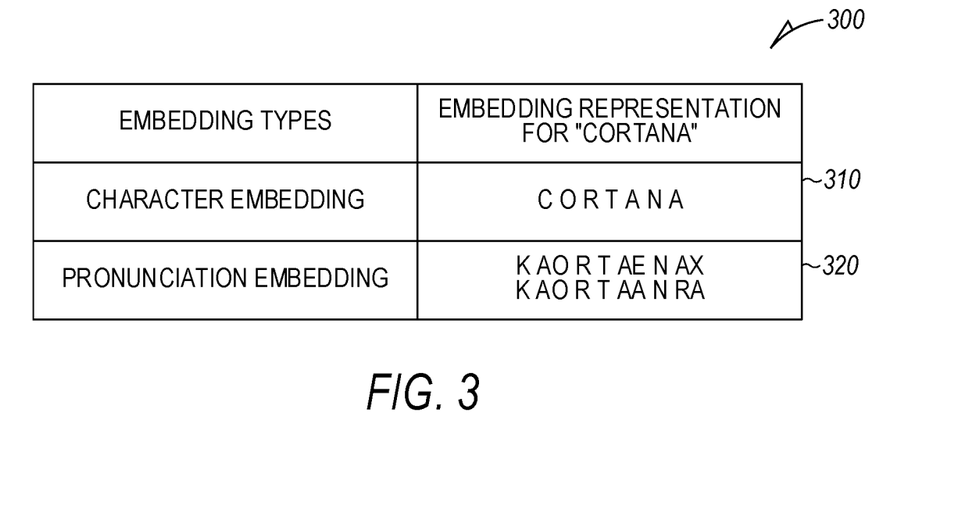
FIG. 3 is a table illustrating character embedding for an example word according to an example embodiment.

Referring to as shown in FIG. 3 at Table 300, Table. 1, the character embedding for "cortana" at 310 is a vector with {2, 1, 1, 1, 1, 1} at respective locations for {'a', 'c', 'n', 'o', 'r', 't'}. The rest of the vector elements are 0. The "2" in the vector illustrates that the letter "a" has two occurrences in "cortana."

Character embedding offers several advantages: (a) they are smaller dimensional features, (b) they require little computing resource, (c) are easily computed on the fly, and don't require any memory or storage, as the character count for a word can be trivially computed when needed without the need to store character embeddings. As shown in FIG. 1 at 100, an existing confidence mechanism is expanded by extracting baseline confidence features from ASR lattices, features 140. A specific word is used for character embedding. Functionality is embedded in the lattice generation or lattice post-processing steps to compute character embedding for the words in the ASR hypothesis included with features 140. ASR systems essentially model phones, and the character embedding is at best a good approximation. Furthermore, "Cortana" pronounced in different ways will have identical character embeddings, despite different acoustic scores. Given that, phone embedding, described below may also or alternatively be used to expand the features provided to the confidence classifier 160.

An ASR system is essentially a match between the speech frames and acoustic states under language model constraints. In some examples, 9000 context-dependent triphones may be used to represent acoustic states. A 9000-dimensional vector may be used to represent a count of each of the triphones in a word but that is significantly larger than the 21 confidence features in one example set of baseline confidence features 140, and will likely overfit the task. Such a large vector would also make it difficult to train and maintain the confidence classifier due to sparsity issues, as only a few of the states will be non-zero in a word.

In one embodiment, monophone units are used for word pronunciation embedding. The phone embedding for "cortana" is shown at 320 in Table 300. The enUS ASR model consists of 40 monophones in one embodiment, with a hand-crafted monophone dictionary used to represent the words in monophone units. The pronunciation of a word can be given as a series symbols that correspond to the individual units of sound that make up a word. These are called 'phonemes' or 'phones'. A monophone refers to a single phone. For example, the word "translate" may correspond to the following monphones: t r@n s l e t. Monophones are a well know construct in speech recognition. As with word character embedding, fewer than 40 monophones may be used in some embodiments.

Phone embedding retains all the advantages of character embedding. With character embedding, there is an issue with identical character embedding for different pronunciations of a word. Phone embeddings address that issues by allowing multiple pronunciations for words in a dictionary. The computation for phone embedding is similar to that for character embedding except that the embedding units are phones. Embedding for multiple pronunciations for a word may be calculated as an average over the embedding from individual pronunciations. This computation simply uses the specific word and the monophone dictionary, that the ASR decoding already has access to.

In one example, OOG utterances may be prepared from movie or meeting tasks. OOG data may be simulated by decoding IG utterances against a mismatched grammar. The performance of the confidence classifier may be characterized in terms of mean squared error (MSE) on training and validation tasks, as well as in terms of CA=#AllCorrects beyond a threshold #AllCorrects, and, FA=#AllIncorrects beyond a threshold #AllIncorrects, there #indicates count.

To train the confidence classifier 160, labeled confidence training data of over 1000 hrs of speech for one or more applications, such as Xbox and Server may be used. Significantly smaller or larger amounts or training data may be used in further embodiments. The combination of acoustic and character embedding may improve the MSE to 0:199. Furthermore, integrating the embedding with all the baseline features improves the MSE from 0:188 to 0:183.

In one embodiment, the confidence classifier is an MLP classifier. The MLP classifier may be enhanced by using deep-architectures in DNNs and K-DCN. Deep neural networks (DNN) are widely being used in state-of-the-art learning systems. DNNs extend ML in terms of a larger number of hidden layers. The different hidden layers can model and learn local as well as higherorder structures in the data.

A Kernel Deep Convex Network (K-DCN) is a kernel version of the deep convex network (DCN). The architecture of DCN and K-DCN concatenates outputs from all previous layers and the original input data as an input to the current layer. K-DCN consists of a kernel ridge regression module, which can be expressed as:

$$f(x) = \sum_{i=1}^{N} \alpha_i k(x, x_i) = k(x)^T \alpha \quad (1)$$

where a sample x is evaluated with respect to all the training samples $\{x_i\}_{i=1}^{N}$, $\alpha$ is the regression coefficient, and vector k(x) is with element $k_n(x)=k(x_n; x)$. The regression coefficient $\alpha$ has a closed form solution:

$$\alpha = (\lambda I + K)^{-1} Y \quad (2)$$

where $\lambda$ is the regularization parameter, $K \in \mathbb{R}^{N \times N}$ is a kernel matrix with elements $K_{mn}=k(x_m, x_n)$, $\{x_i\}_{i=1}^{N}$ are from the training set, and $Y=[y_1, \ldots, y_N]^T \in \mathbb{R}^{N \times M}$ are the M-class label vectors for training.

In a further embodiment, Glove embeddings may be added to the baseline features in addition to one or more of the word embedding confidence features. Glove embeddings encode contextual word information. Such embeddings are distinct from the character and phone embeddings.

Figure 4:
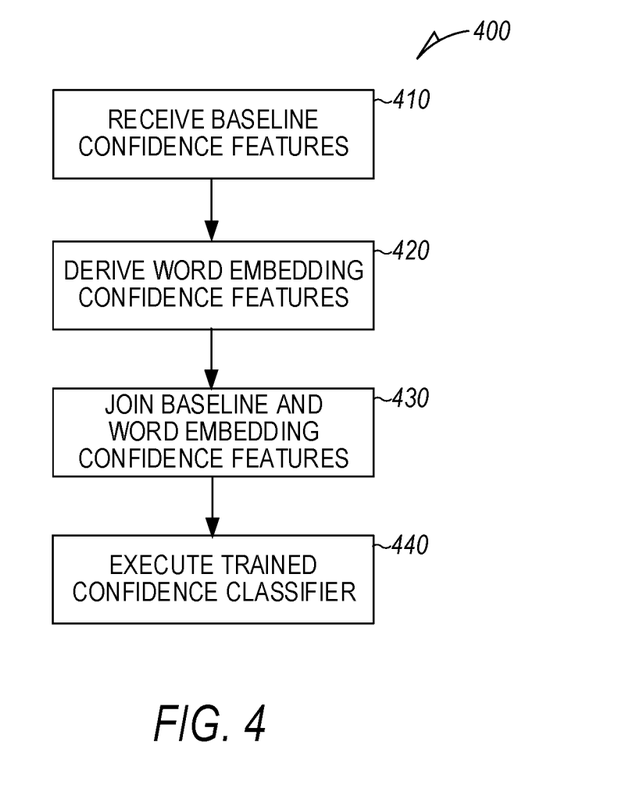
FIG. 4 is a flowchart illustrating a computer implemented method of enhancing a speech recognition confidence classifier with word embedding confidence features according to an example embodiment.

FIG. 4 is a flowchart illustrating a computer implemented method 400 of enhancing a speech recognition confidence classifier with word embedding confidence features. Method 400 begins by receiving a set of baseline confidence features from one or more decoded words at operation 410. Word embedding confidence features are derived at operation 420 from the baseline confidence features. The word embedding confidence features comprise character embeddings. The character embeddings comprise 26 embeddings comprising the letters in the English alphabet. The character embedding for a word may be in the form of a vector having values for each letter consisting of the count of the number of each letter in the word. Values in the vector corresponding to letter not in the word or other utterance may be set to zero.

The word embedding confidence may also be or include features comprising phone embeddings. The phone embeddings may be monophones selected from a dictionary comprising 40 monophones. The word embedding confidence features may include both character embeddings and phone embeddings.

The baseline confidence features are joined with the word embedding confidence features at operation 430 to create a feature vector. At operation 430, the confidence classifier is executed to generate a confidence score. The confidence classifier is trained with a set of training examples having labeled features corresponding to the feature vector. The feature vector may also include GLOVE embeddings.

The confidence classifier may be trained for word-level as well an utterance-level classification. The baseline features may include two or more of acoustic-model scores, background-model scores, silence-model scores, noise-model scores, language model scores, and duration features.

Figure 5:
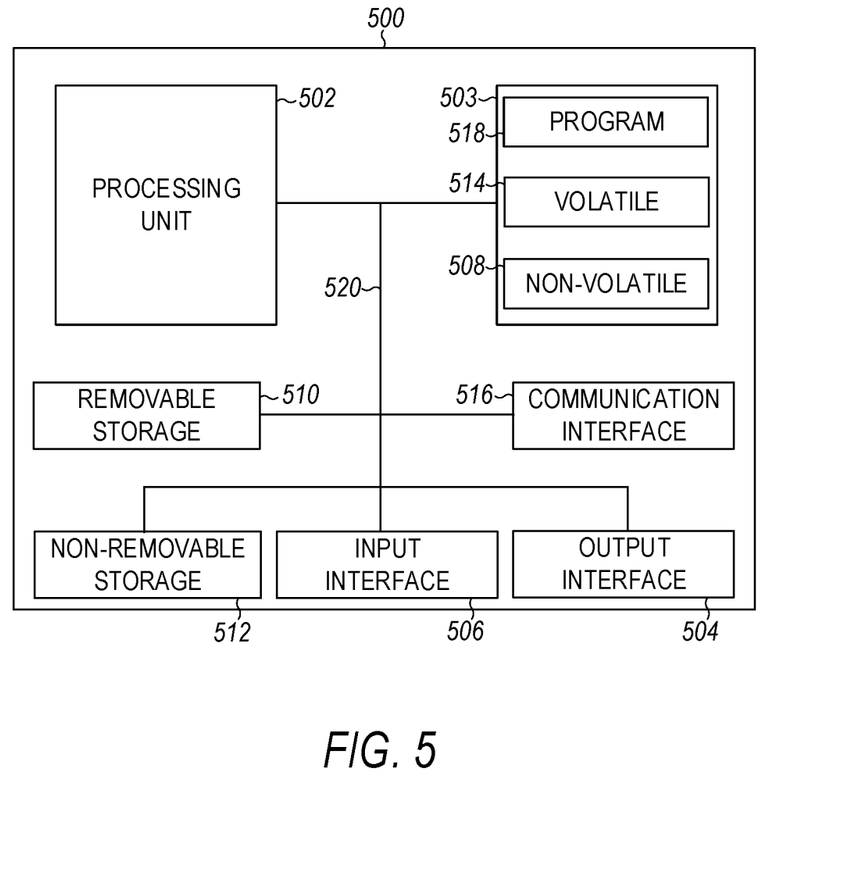
FIG. 5 is a block schematic diagram of a computer system to implement one or more example embodiments.

FIG. 5 is a block schematic diagram of a computer system 500 to implement an improved ASR confidence classifier algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more confidence classifiers. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

EXAMPLES

A method of enhancing an automated speech recognition confidence classifier includes receiving a set of baseline confidence features from one or more decoded words, deriving word embedding confidence features from the baseline confidence features, joining the baseline confidence features with word embedding confidence features to create a feature vector, and executing the confidence classifier to generate a confidence score, wherein the confidence classifier is trained with a set of training examples having labeled features corresponding to the feature vector.

2. The method of example 1 wherein the word embedding confidence features comprise character embeddings.

3. The method of example 2 wherein the character embeddings comprise less than 26 embeddings comprising letters.

4. The method of any of examples 2-3 wherein the character embedding for a word comprises a vector having values for each letter consisting of the count of the number of each letter in the word.

5. The method of any of examples 1-4 wherein the word embedding confidence features comprise phone embeddings.

6. The method of example 5 wherein the phone embeddings comprise monophones selected from a dictionary comprising 40 or fewer monophones.

7. The method of any of examples 1-6 wherein the word embedding confidence features comprise character embeddings and phone embeddings.

8. The method of any of examples 1-7 wherein the feature vector further comprises GLOVE embeddings.

9. The method of any of examples 1-8 wherein the confidence classifier is trained for word-level as well an utterance-level classification.

10. The method of any of examples 1-9 wherein the baseline features comprise two or more of acoustic-model scores, background-model scores, silence-model scores, noise-model scores, language model scores, and duration features.

11. A machine-readable storage device having instructions for execution by a processor of a machine to cause the processor to perform operations to generate a confidence score for a word or utterance. The operations include receiving a set of baseline confidence features from one or more decoded words, deriving word embedding confidence features from the baseline confidence features, joining the baseline confidence features with word embedding confidence features to create a feature vector, and executing the confidence classifier to generate a confidence score, wherein the confidence classifier is trained with a set of training examples having labeled features corresponding to the feature vector.

12. The device of example 11 wherein the word embedding confidence features comprise character embeddings.

13. The device of example 12 wherein the character embeddings comprise 26 or fewer embeddings comprising letters in an alphabet.

14. The device of any of examples 12-13 wherein the character embedding for a word comprises a vector having values for each letter consisting of the count of the number of each letter in the word.

15. The device of any of examples 11-14 wherein the word embedding confidence features comprise phone embeddings including monophones selected from a dictionary comprising 40 or fewer monophones.

16. The device of any of examples 11-15 wherein the word embedding confidence features comprise character embeddings and phone embeddings.

17. The device of any of examples 11-16 wherein the confidence classifier is trained for word-level as well an utterance-level classification and wherein the baseline features comprise two or more of acoustic-model scores, background-model scores, silence-model scores, noise-model scores, language model scores, and duration features.

18. A device includes a processor and a memory device coupled to the processor and having a program stored thereon for execution by the processor to perform operations. The operations include receiving a set of baseline confidence features from one or more decoded words, deriving word embedding confidence features from the baseline confidence features, joining the baseline confidence features with word embedding confidence features to create a feature vector, and executing the confidence classifier to generate a confidence score, wherein the confidence classifier is trained with a set of training examples having labeled features corresponding to the feature vector.

19. The device of example 18 wherein the word embedding confidence features comprise one or more of character embeddings and phone embeddings including monophones.

20. The device of any of examples 18-19 wherein the confidence classifier is trained for word-level as well an utterance-level classification and wherein the baseline features comprise two or more of acoustic-model scores, background-model scores, silence-model scores, noise-model scores, language model scores, and duration features.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method of enhancing an automated speech recognition confidence classifier comprising:
   receiving a set of baseline confidence features from one or more decoded words;
   deriving word embedding confidence features from the baseline confidence features;
   joining the baseline confidence features with word embedding confidence features to create a feature vector; and
   executing the confidence classifier to generate a confidence score, wherein the confidence classifier is trained with a set of training examples having labeled features corresponding to the feature vector.

2. The method of claim 1 wherein the word embedding confidence features comprise character embeddings.

3. The method of claim 2 wherein the character embeddings comprise less than 26 embeddings comprising letters.

4. The method of claim 2 wherein the character embedding for a word comprises a vector having values for each letter consisting of the count of the number of each letter in the word.

5. The method of claim 1 wherein the word embedding confidence features comprise phone embeddings.

6. The method of claim 5 wherein the phone embeddings comprise monophones selected from a dictionary comprising 40 or fewer monophones.

7. The method of claim 1 wherein the word embedding confidence features comprise character embeddings and phone embeddings.

8. The method of claim 1 wherein the feature vector further comprises GLOVE embeddings.

9. The method of claim 1 wherein the confidence classifier is trained for word-level as well an utterance-level classification.

10. The method of claim 1 wherein the baseline features comprise two or more of acoustic-model scores, background-model scores, silence-model scores, noise-model scores, language model scores, and duration features.

11. A machine-readable storage device having instructions for execution by a processor of a machine to cause the processor to perform operations to generate a confidence score for a word or utterance, the operations comprising:
receiving a set of baseline confidence features from one or more decoded words;
deriving word embedding confidence features from the baseline confidence features;
joining the baseline confidence features with word embedding confidence features to create a feature vector; and
executing the confidence classifier to generate a confidence score, wherein the confidence classifier is trained with a set of training examples having labeled features corresponding to the feature vector.

12. The device of claim 11 wherein the word embedding confidence features comprise character embeddings.

13. The device of claim 12 wherein the character embeddings comprise 26 or fewer embeddings comprising letters in an alphabet.

14. The device of claim 12 wherein the character embedding for a word comprises a vector having values for each letter consisting of the count of the number of each letter in the word.

15. The device of claim 11 wherein the word embedding confidence features comprise phone embeddings including monophones selected from a dictionary comprising 40 or fewer monophones.

16. The device of claim 11 wherein the word embedding confidence features comprise character embeddings and phone embeddings.

17. The device of claim 11 wherein the confidence classifier is trained for word-level as well an utterance-level classification and wherein the baseline features comprise two or more of acoustic-model scores, background-model scores, silence-model scores, noise-model scores, language model scores, and duration features.

18. A device comprising:
a processor; and
a memory device coupled to the processor and having a program stored thereon for execution by the processor to perform operations comprising:
receiving a set of baseline confidence features from one or more decoded words;
deriving word embedding confidence features from the baseline confidence features;
joining the baseline confidence features with word embedding confidence features to create a feature vector; and
executing the confidence classifier to generate a confidence score, wherein the confidence classifier is trained with a set of training examples having labeled features corresponding to the feature vector.

19. The device of claim 18 wherein the word embedding confidence features comprise one or more of character embeddings and phone embeddings including monophones.

20. The device of claim 18 wherein the confidence classifier is trained for word-level as well an utterance-level classification and wherein the baseline features comprise two or more of acoustic-model scores, background-model scores, silence-model scores, noise-model scores, language model scores, and duration features.

* * * * *